June 20, 1933. C. O. BERGSTROM 1,914,988
DYNAMO-ELECTRIC MACHINE
Filed July 5, 1929 2 Sheets-Sheet 1
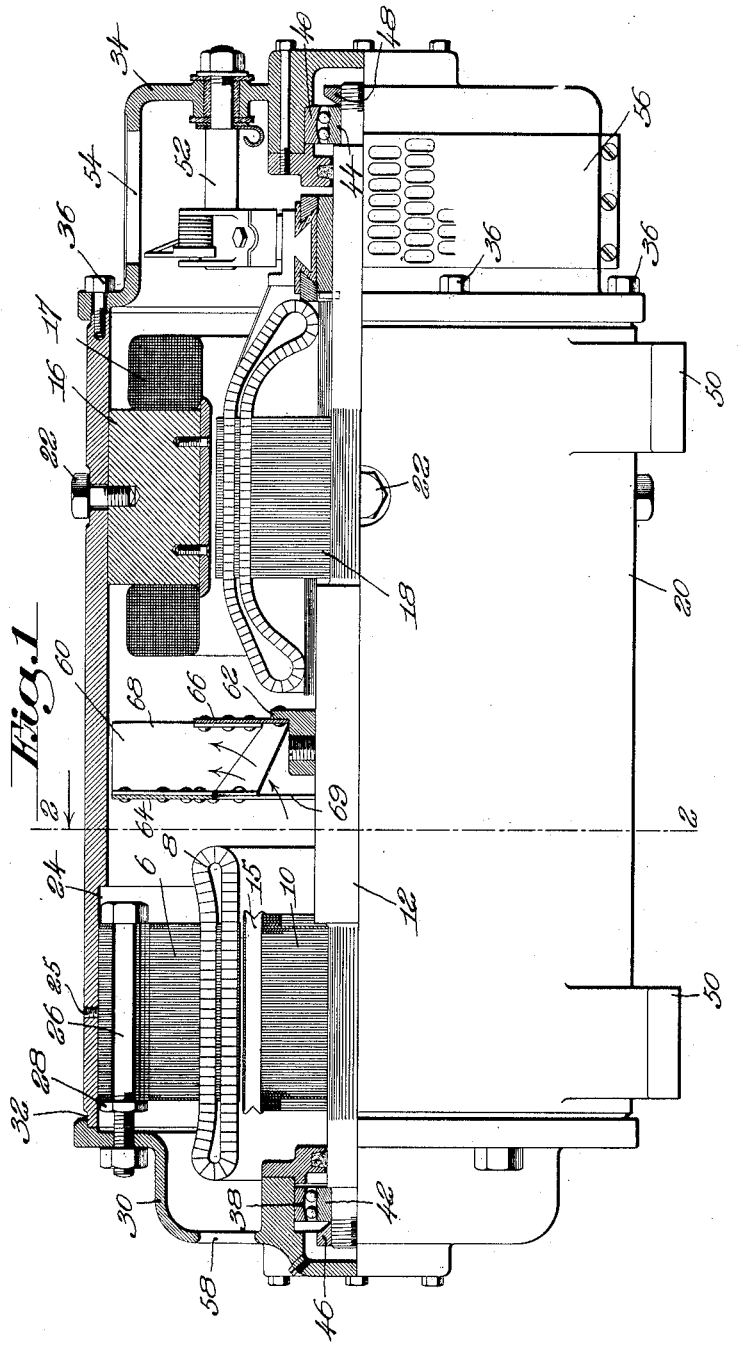

June 20, 1933.  C. O. BERGSTROM  1,914,988
DYNAMO-ELECTRIC MACHINE
Filed July 5, 1929   2 Sheets-Sheet 2
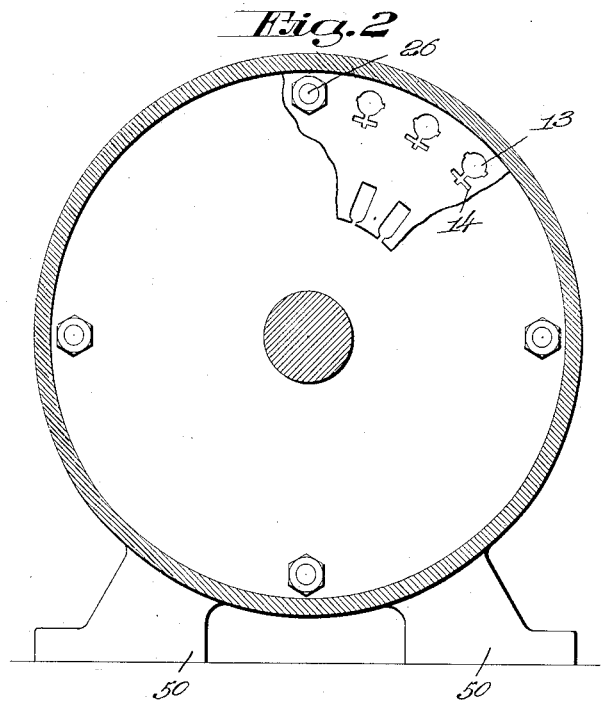
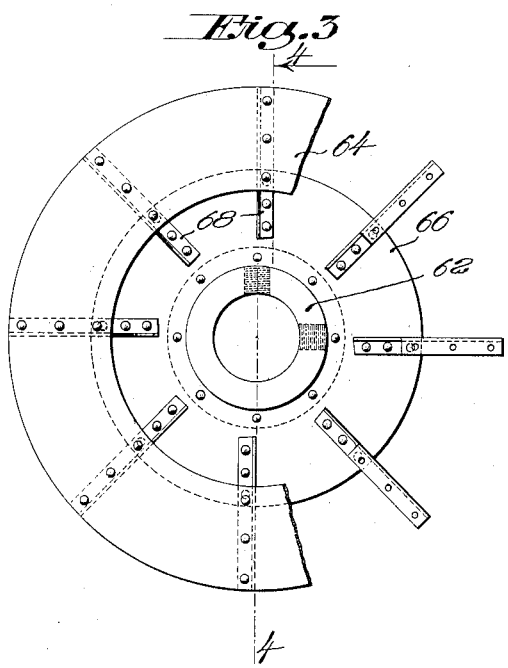
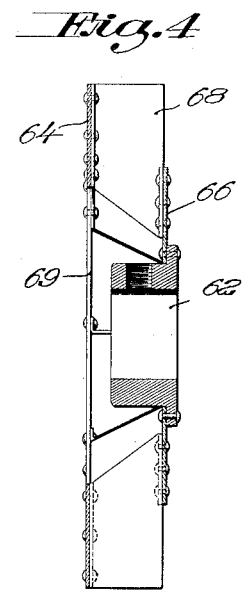
Witness
Frederick S. Greenleaf.
Inventor
Carl O. Bergstrom
by his Attorneys Patented June 20, 1933

1,914,988

UNITED STATES PATENT OFFICE

CARL O. BERGSTROM, OF MATTAPAN, MASSACHUSETTS, ASSIGNOR TO B. F. STURTEVANT COMPANY, OF HYDE PARK, MASSACHUSETTS, A CORPORATION OF MASSACHUSETTS

DYNAMO-ELECTRIC MACHINE

Application filed July 5, 1929. Serial No. 375,991.

The present invention relates to dynamo-electric machines and more particularly to motor-generator sets.

One object of the present invention is to provide a simple, inexpensive and rugged motor-generator set.

Another object of the invention is to provide a dynamo-electric machine having a simple and efficient cooling and ventilating system.

With these objects in view, the present invention consists of the dynamo-electric machine and the cooling apparatus hereinafter described and particularly defined in the claims.

In the accompanying drawings, Fig. 1 is an elevation partly in section of the preferred form of motor generator embodying the features of the present invention; Fig. 2 is a section on line 2—2 of Fig. 1; Fig. 3 is an end elevation of the fan; and Fig. 4 is a sectional view of the same on line 4—4 of Fig. 3.

The illustrated embodiment of the invention comprises a motor-generator set including an induction motor and a direct current generator. The motor, as shown in Fig. 1, comprises a stator indicated generally at 6 having the stator winding 8 and a squirrel cage rotor 10 secured to the knurled portion of a shaft 12. The stator comprises a plurality of laminations provided with registering ventilating openings 13 arranged near the periphery (see Fig. 2). Below each opening 13 is a rectangular bar receiving opening 14 to receive a stator locking bar which serves to hold the laminations together. This locking bar is preferably of the type shown in co-pending application of Bergstrom, Serial No. 167,455, filed February 11, 1927.

The rotor 10 has the rotor conductors 15 which are similar in shape to the stator locking bars and the rotor is constructed in accordance with the disclosure of the above-mentioned co-pending application.

The direct current generator comprises the field magnets 16, the field windings 17 and the armature 18, which latter is also mounted on a knurled portion of the shaft 12. The stator 6 and the field 16 are mounted together in a single frame or casing 20 which is of straight cylindrical form and for economy of construction may comprise a length of wrought iron tubing or pipe. The field magnets 16 are secured to the frame by bolts 22.

At the motor end of the frame is accurately machined at 24 to receive the stator 6 which is also machined and is received in the machined portion of the frame with a drive fit and secured by set screws 25. Extending through several of the openings 13 are bolts 26 which are secured to the stator by nuts 28 and which extend outwardly beyond the end of the frame to serve as attaching means for the end closure or bearing support 30. The end closure is machined at its periphery to engage over a machined portion 32 of the cylindrical frame. The end closure or bearing support 34 at the generator end of the frame is secured to the frame by bolts 36.

The end closures 30 and 34 carry the self-aligning ball bearing races 38 and 40. One of the races indicated as the race 38 in Fig. 1, has provision for slight endwise play, whereas the other race 40 is securely held in position. Complementary ball races 42 and 44 are secured to the shaft and held in place by nuts 46 and 48 respectively.

The frame 20 has the standards 50 secured thereto by welding, brazing, or any suitable means.

The end closure 34 at the generator end is provided with the usual brush supports 52. The casing is provided with a peripheral opening 54 which is closed by a perforated band of sheet metal 56. The end closure 30 is provided with suitable ventilating openings 58.

The support for the motor and generator units is such that they may be easily mounted in the casing or removed therefrom. Thus, to disassemble the machine, it is only necessary to remove the end closures 30 and 34, and then to take out the generator field and field magnets by removing the bolts 22. After taking off the bearing nut 46 and bearing at the motor end, the entire rotating assembly including the shaft, the rotor 10, the armature 18, and the fan, may be slipped out.

It will be seen that the construction thus far described is an extremely simple and inexpensive one. Alignment of the units is at all times maintained. The single shaft 12, in combination with the self-aligning bearings, avoids the necessity for coupling and promotes smooth and efficient operation.

Ventilation and cooling of the generator are effected by directing currents of air through the ventilating openings of the stator as well as between the stator and rotor of the induction motor. The air passes thence between the field and armature of the generator and finally outwardly through the perforations of the plate 56. It is preferable to direct the air first across the motor and then across the generator rather than in the reverse direction because of the fact that particles of dust formed at the commutator are blown directly outward into the atmosphere without being carried into the moving parts.

The means for directing the air currents through the motor generator comprises a fan indicated generally at 60. As shown in Fig. 2, the fan comprises a hub 62 adapted to be attached to the shaft between the motor and generator, together with an inlet shroud or plate 64 and an outlet shroud or back plate 66, the latter being attached directly to the hub and the former being supported upon the blades 68 which in turn are riveted to the back plate 66. As shown in Figs. 3 and 4, the inlet plate is of annular form extending outwardly nearly to the inner wall of the frame with an annular intake opening 69. The outer diameter of the back plate 66 is somewhat greater than the inner diameter of the inlet plate 64, but is substantially less than the outer diameter of the inlet plate, so that the blades 68 are open ended adjacent their tips. Upon rotation of the fan, the air is taken in through the intake 69 in the inlet plate and is directed radially outward by centrifugal force as indicated by the arrows in Fig. 1. The tips of the blades have only a slight clearance from the frame 20, and the air is therefore forced to turn into an axial direction, which action is facilitated by the open ends of the blades. The air is thus drawn through the motor and forced through the generator. The blades 68 are of plane formation and are arranged perpendicular to the plates so that the fan will operate under either direction of rotation of the shaft. It will be seen that the fan is a centrifugal fan which by reason of the cylindrical casing and open ended blades directs the air axially. The fan of the present invention offers important advantages over a propeller fan in that it operates more efficiently to build up a higher pressure, thereby overcoming the considerable resistance of the motor generator set.

It will be understood that although the invention has been shown and described as embodied in a specific form of dynamo-electric machine and ventilating system, the invention is not to be considered as limited to such specific form, but may include other forms within the scope of the claims.

The invention having been thus described, what is claimed is:

1. A motor generator set comprising a cylindrical casing, an alternating current motor and a direct current generator mounted at opposite ends in the casing, the motor having a stator received in the casing with a drive fit, the generator having a field within and removably secured to the casing, a shaft for the rotating parts of the motor and the generator, a fan on the shaft between the motor and the generator, end closures for the casing, one of which is secured to the motor stator, and bearings in the end closures forming the sole supports for the shaft, whereby upon removal of the end closures and the generator field, the entire rotating assembly may be taken out of the casing.

2. A motor generator set comprising a straight integral cylindrical casing, a motor mounted in the casing at one end thereof, a generator mounted in the casing at the other end, end closures for the casing, a single pair of bearings carried by the end closures, a shaft journaled in the bearings and connecting the motor and the generator, and ventilating means comprising inlet ports in one of said end closures, and outlet ports in the other end closure, and means for impelling a current of air through said casing from end to end thereof.

3. A motor generator set comprising a straight integral cylindrical casing, a motor mounted in the casing at one end thereof, a generator mounted in the casing at the other end, end closures for the casing, a single pair of bearings carried by the end closures, a shaft journaled in the bearings and connecting the motor and the generator, and ventilating means comprising inlet ports in one of said end closures, and outlet ports in the other end closure, and means positioned between said motor and said generator for impelling a current of air through said casing from end to end thereof.

In testimony whereof I have signed my name to this specification.

CARL O. BERGSTROM.